Jan. 21, 1958  M. F. PETERS  2,820,615

HEAT EXCHANGER

Filed Jan. 18, 1955

INVENTOR.
Melville F. Peters
BY Martin J. Finnegan
ATTORNEY

United States Patent Office 2,820,615
Patented Jan. 21, 1958

2,820,615

HEAT EXCHANGER

Melville F. Peters, Livingston, N. J.

Application January 18, 1955, Serial No. 482,472

2 Claims. (Cl. 257—241)

This invention relates to heat exchange, and particularly to flexible assemblies that can be associated with an object to be controlled in such a manner as to exercise such control by means of the flow of fluid through at least a portion of the flexible assembly.

In many power plant installations it is necessary to cool the exhaust pipes or to absorb a portion of the heat which is dissipated by the pipes with a cooling system, so as to eliminate the possibility of burning the personnel or overheating the compartment. When space is available and the weight of the cooling system is not important, water can be circulated through a jacket placed around the object. If the unit is subjected to vibration the jacket must be reinforced so that it has a high factor of safety, since the escape of fluid from the system could be disastrous. When weight and space are both limited, it is often impractical to use a jacketed cooling system and it is necessary to rely upon baffles and plates to reflect the radiation and guide the convection currents of air away from the personnel. There are conditions, however, where the quantity of heat which must be removed from the object is so great that a cooling fluid must be used to remove the heat from the compartment, and it is therefore the first object of the invention to produce a relatively light and compact cooling system which absorbs and transmits the heat to a fluid flowing through at least a portion of the cooling system. It is a second object of the invention to produce a heat exchanger which is flexible and can be formed or placed around an object to control the flow of heat from the object into designated regions.

A conduit can be heated or cooled by passing a fluid through a flexible tube which has been wound around the conduit. If the tubing is convoluted or corrugated and the conduit has smooth cylindrical or rectangular surfaces, the rate of heat transfer between the tubing and conduit will be small because the contacting area between the conduit and the tubing is limited to a very small area on the outer periphery of each convolution or corrugation. If the conduit vibrates the life of the tubing will be short, because abrasion will take place at the small contacting surfaces between the tubing and the conduit. These two objections can be overcome by securing the tubing to a strip by brazing, soldering, or welding. The thermal conductivity between tubing and strip can be increased by increasing the cross-sectional area of the soldered or welded joints. It is therefore a third object of the invention to form a flexible thermal shield by brazing, soldering, or welding a flexible tube to a strip.

It is a fourth object of the invention to secure a flexible metal hose with end fittings to a strip by brazing, soldering, or welding, so that the hose can form part of a fluid circuit, while the assembly will have sufficient flexibility to wrap around a conduit.

It is a fifth object of the invention to increase the thermal conductivity between the flexible tubing and strip by adding metal to the brazed, soldered or welded surfaces.

The cross-sectional area between the flexible tubing and strip can be further increased by flattening a portion of the outer periphery of the convolutions, or by substituting a flexible rectangular conduit for the circular tubing and brazing, soldering, or welding one edge of each convolution to the strip. It is therefore a sixth object of the invention to braze, solder, or weld a rectangular fluid-tight conduit which may be supplied with end fittings to a strip, so that the conduit can form part of a fluid circuit and the combination of conduit and strip will have sufficient flexibility to permit it to be wrapped around another conduit or chamber and serve as a heat exchanger.

When the radiation from a heated object must be completely absorbed by the shield, the strips can be wound so that their edges are in contact throughout their length. When the cooling assembly must be self-supporting, the contacting edges can be formed to interlock and form a rigid assembly. It is therefore a seventh object of the invention to provide the strips with interlocking edges, so that when the assembly is coiled, the mating edges of the strips will interlock to form a self-supporting assembly of strips and fluid-tight tubing.

It is an eighth object of the invention to perforate the strip so that air can circulate or pass through the holes when the edges of the strip are fastened together.

It is a ninth object to form ridges on the strips in a manner to make an acute angle with the edges, so that when fluid-tight flexible tubing is secured to the strip the assembly can be used as a heat exchanger which allows air to circulate between the inner surface of the heat exchanger and the conduit.

When a narrow strip is used to support the flexible tubing in the heat exchanger, the strip may not be wide enough to span the convolutions or corrugations of a conduit which has bellows type construction, so that the edges of the strip may drop below the outer periphery of the conduit and rub the sides or walls of the corrugations. This can be prevented by making the width of the strip great enough to cover several convolutions and will in many cases require the flexible hose to be coiled upon the strip to insure adequate cooling. The heat exchanger will then consist of a flexible wide strip or sheet having a width equal to the outer periphery of the conduit and a length which is determined by the service conditions, and to this sheet is secured a coiled flexible tubing, so that the unit can be bent around the conduit and the mating edges secured together. When the heat interchanger must have a more rugged construction and be capable of absorbing and dissipating heat at a rate which excludes the use of a thin flexible strip or sheet, the flexible features can still be maintained by pre-forming two or more thick sheets, so that their edges can be fastened together and the temperature of the sheets controlled by passing a fluid through either the flexible or rigid tubing which is attached to the sheets. Rigid tubing can also be used with a flexible sheet when the heat exchanger is bent around a cylindrically shaped conduit, provided the rigid tubing is placed parallel to the axis of the conduit and the ends of the rigid lengths are joined together with flexible hose. It is therefore a tenth object of the invention to secure the flexible tubing to a sheet of metal which can be pre-formed and secured in place so that when fluid is passed through the tubing the combination of tubing and sheet can serve as a heat interchanger.

Fluids flowing through a vibrating tube will undergo an acceleration with each fractional cycle of vibration and consequently this change in phase of the liquid with respect to the tube will serve to dampen the vibration. It is therefore an eleventh object of the invention to control the rate of fluid flow through the heat interchanger so that both the temperature and the amplitude of vibration of the conduit will remain within predetermined limits.

In many installations good thermal conductivity is not required between the tubing and the strip or sheet, and the tubing can be mechanically held in contact with the strip by staples which are formed in the strip, or by screws, rivets, or twisted wires, so that it is not necessary to weld the tubing to the strip. It is therefore a twelfth object of the invention to form a heat interchanger by mechanically fastening a fluid-tight conduit to a strip or metal plate and cooling the strip or plate by passing a fluid through the conduit.

When the heat interchanger must be bent through a small radius of curvature and it is necessary to lock the edges, neither edge of the strip can be raised to overlap the other edge, and a second strip must engage studs or other locking mechanisms on both edges of the strip. It is therefore a thirteenth object of the invention to use a strip with studs or buttons on both edges and to lap these edges with a second strip having mating holes, so that the edges of the strip will be locked together by the studs or buttons fitting into the holes of the second strip.

The sheets which are used in combination with the fluid-tight tubing can be supported by the enclosing structure such as the walls of an airplane, guided missile, tank, or other housing operating at a temperature differing from that of the walls. It is therefore a fourteenth object of the invention to secure the sheets of the interchangers to the walls, or to the supporting enclosure, and to control the temperature of the enclosure by passing a fluid through the tubing which forms at least a part of the interchanger.

It is a fifteenth object of the invention to attach the tubing to the enclosing walls or other support to control the temperature thereof by the fluid passing through the tubing.

Figure 1:
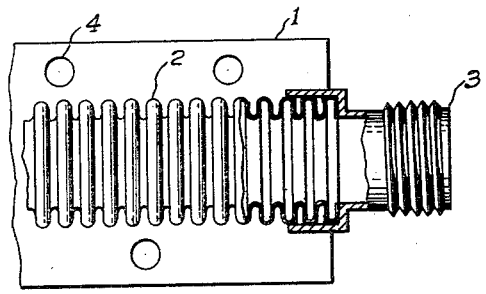
Fig. 1 is a top plan view, partly in section, of a flexible hose with end fittings attached to a strip; an embodiment of the invention.
Figure 2:
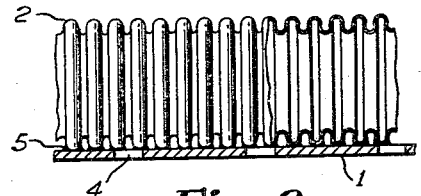
Fig. 2 is a side view, partly in section, of a portion of a flexible hose secured to a strip, a second embodiment.
Figure 3:
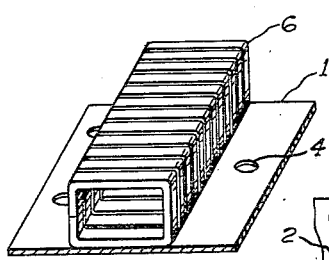
Fig. 3 is an isometric view of a portion of a rectangular conduit secured to a strip, a third embodiment.

In Figs. 1 and 2 the flexible hose or conduit 2 is secured at the point or area of contact between the outer periphery of the convolutions and the strip 1, at 5. When good thermal conductivity is required between 1 and 2, the outer periphery of the convolutions can be flattened over a limited extent of their circumference and the flattened part secured to the strip, or additional metal added to the vicinity of the joined surfaces, to increase the cross-sectional area of the joint. The conductivity can be further increased by substituting the rectangular flexible conduit 6 of Fig. 3 for the circular hose 2 and securing the contacting surfaces between 6 and 1 together. The flexibility of the heat interchanger is increased by decreasing the number of convolutions secured to the strip. The greatest flexibility is obtained by fastening the flexible conduit to the strip with staples, twisted wires, or other mechanical attachments. The fitting at 3 connects the tubing to the fluid coolant circuit, and in many installations the fluid coolant will be air or water. The holes or openings at 4 permits air to pass from one side of the strip to the other.

Figure 4:
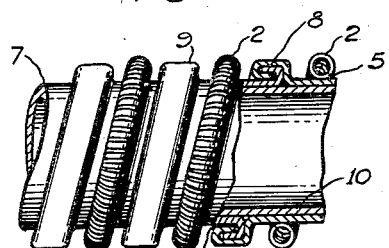
Fig. 4 is a view, partly in section, of flexible tubing interlocked with a surrounded conduit, a fourth embodiment.

In Fig. 4 the hose 2, secured to strip 7, is coiled or wrapped around a conduit 10. One edge of the strip is turned over to form a U, or hook, at 8, and the other edge forms the larger mating hook at 9. When the strip is wound to bring the two edges together, hooks 8 and 9 interlock. When the installation is to be permanent, hook 9 may be pressed or hammered to form the well-known folded joint. Further strength may be obtained by welding or soldering the compressed seam at 9. Since the cooling fluid is moving through the hose during each cycle of vibration, the forces exerted by the fluid on the hose will be out of phase with the external forces. The result will be vibration of the heat exchanger, which vibration will be damped by the flowing fluid.

Figure 6:
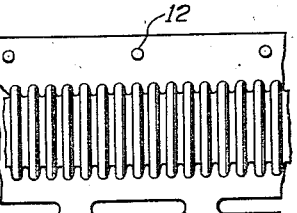
Fig. 6 is a top plan view of the tubing and strip of Fig. 5 as they appear before coiling.
Figure 5:
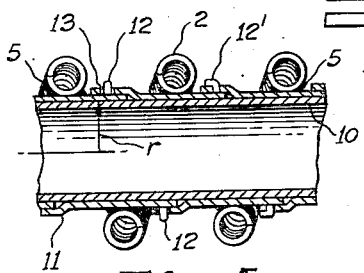
Fig. 5 is a sectional view of a fifth embodiment.

A second method of securing the mating edges of the coiled strip assembly is shown in Figs. 5 and 6. One side of strip 11 has a stud 12 which fits into the hole 13, the latter being elongated to increase the probability that the stud and hole will match when the radius of the conduit is r. The rigidity of the shield can be increased and the edges of the exchanger locked together by bending or flattening studs 12, as at 12'. When the installation is of a temporary nature, the edges may be locked together by replacing the studs with turn-buckles, cotter-pins, or screws.

Figure 7:
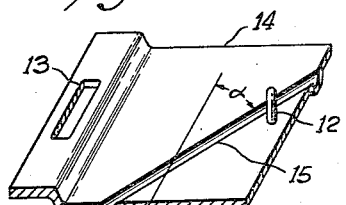
Fig. 7 is an isometric view of the strip of Fig. 6, with a leg attached for contact with the conduit.

The strip 14 in Fig. 7 is essentially the same as the strip 11 of Figs. 5 and 6 except for the legs 15. These are punched from the strip or attached at an angle "alpha," as indicated in Fig. 7, which angle can have any value between zero and plus or minus one-half "pi," so that the only contacting surfaces between strip 14 and the conduit or chamber 10, is through the contacting surfaces 15' of legs 15.

Figure 9:
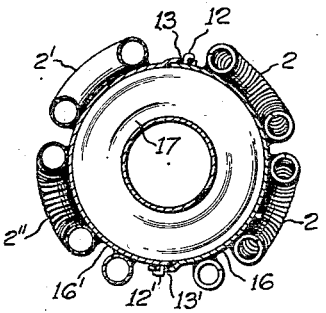
Fig. 9 is a sectional end view of the heat exchanger and conduit of Fig. 5.
Figure 8:
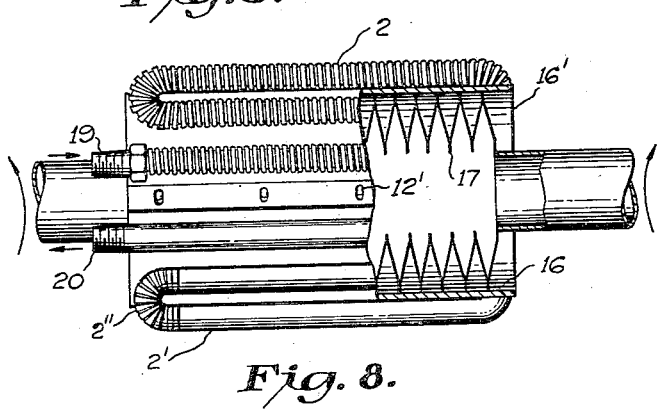
Fig. 8 is a top plan view, partly in section, of another interlocking assembly.

In Figs. 8 and 9 the sheets 16, 16' are formed or wrapped around the conduit 17 which may have a smooth surface or an irregular one such as that of a flexible tube or bellows. When thick sheets are required and the heat exchanger must fit around a small diameter conduit, it is best to pre-form at least two sections and fasten them together at their mating edges 12, 13 and 12', 13'. Rigid tubing 2' can be used in the assembly throughout, or the flexibility can be maintained at right angles to the tubing as indicated by the arrows, by capping the ends of the rigid tubing 2' with the flexible end fittings 2". When it is possible to use material which is thin enough to be bent into shape, the sheets can be made in one piece and joined together at 12, 13, and the joints 12', 13' eliminated.

When the conduit has a complex structure, or a relatively extensive area, a plural-sheet or plural-section arrangement may be resorted to, in which the sheets may form the walls of the enclosure, and the tubing be secured thereto. The temperature of the enclosure is controlled by circulating the coolant fluid through 2, 2', and 2" after the fittings 19 and 20 are connected to the fluid supply circuit.

The flexibility of the exchanger is limited by the hook-shaped edges in Fig. 4 and the raised edges in Figs. 5 to 9. To offset this both edges of the strip can have buttons 12, and a strip with holes on both edges similar in shape to holes 13, may be wound around to engage the studs, so that the mating edges will be locked together by the strip.

The word "secured," wherever used, embraces brazing, soldering, or welding.

What I claim is:

1. A heat exchanger assembly comprising a pipe; a flat, elongate strip of metallic material of a thickness to impart inherent flexibility thereto helically wrapped about said pipe, an elongate conduit element extending longitudinally and coextensively with said strip and rigidly fixed in intimate contact to the outer surface thereof, said conduit being corrugated in a direction extending generally transversely of said strip so as to be longitudinally expanded and to be flexed in the same direction as is the strip when the strip and conduit are wrapped as a unit about said pipe in conformity with the outer surface thereof and with the undersurface of the strip in substantially full face-to-face contact with said pipe.

2. A heat exchanger assembly comprising a pipe, a flat, elongate strip of metallic material of a thickness to impart inherent flexibility thereto helically wrapped about said pipe, an elongate conduit element extending longitudinally and coextensively with said strip and rigidly fixed in intimate contact to the outer surface thereof, said conduit being corrugated in a direction extending generally transversely of said strip so as to be longitudinally expanded and to be flexed in the same direction as is the strip when the strip and conduit are wrapped as a unit about said pipe in conformity with the outer surface thereof and with the undersurface of the strip in substantially full face-to-face contact with said pipe, and said strip being wrapped about said pipe so as to have the opposite edges thereof disposed in overlapping relation, and said opposite edges being interlockingly engaged to hold said strip in engagement with said pipe.

References Cited in the file of this patent

UNITED STATES PATENTS

| | | |
|---|---|---|
| 1,164,075 | Dean | Dec. 14, 1915 |
| 1,984,758 | Owen | Dec. 18, 1934 |
| 2,374,609 | McCollum | Apr. 24, 1945 |
| 2,446,289 | Love et al. | Aug. 3, 1948 |
| 2,471,317 | Fausek et al. | May 24, 1949 |
| 2,621,900 | Borg | Dec. 16, 1952 |
| 2,642,897 | Bell | June 23, 1953 |
| 2,736,533 | Allen | Feb. 28, 1956 |

FOREIGN PATENTS

| | | |
|---|---|---|
| 1,060,659 | France | Apr. 5, 1954 |